(12) United States Patent
Murakami et al.

(10) Patent No.: US 11,682,996 B2
(45) Date of Patent: Jun. 20, 2023

(54) POWER CONVERSION DEVICE

(71) Applicant: Mitsubishi Electric Corporation, Tokyo (JP)

(72) Inventors: Satoshi Murakami, Tokyo (JP); Yoshihiro Takeshima, Tokyo (JP); Yoshiaki Ishiguro, Tokyo (JP); Akira Nakagawa, Tokyo (JP); Ryota Kondo, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/772,145

(22) PCT Filed: Jan. 21, 2020

(86) PCT No.: PCT/JP2020/001829
§ 371 (c)(1),
(2) Date: Apr. 27, 2022

(87) PCT Pub. No.: WO2021/149132
PCT Pub. Date: Jul. 29, 2021

(65) Prior Publication Data
US 2022/0407446 A1    Dec. 22, 2022

(51) Int. Cl.
*H02P 27/06* (2006.01)
*H02K 11/33* (2016.01)
*H02M 7/5387* (2007.01)

(52) U.S. Cl.
CPC .............. *H02P 27/06* (2013.01); *H02K 11/33* (2016.01); *H02M 7/5387* (2013.01)

(58) Field of Classification Search
CPC ....... H02P 27/06; H02K 11/33; H02M 7/5387
See application file for complete search history.

(56) References Cited

U.S. PATENT DOCUMENTS

| 8,750,005 B2 | 6/2014 | Fujii et al. |
| 2010/0052583 A1 | 3/2010 | Takamatsu et al. |

(Continued)

FOREIGN PATENT DOCUMENTS

| JP | 2010-57243 A | 3/2010 |
| JP | 5386640 B2 | 1/2014 |

(Continued)

OTHER PUBLICATIONS

International Search Report and Written Opinion dated Apr. 7, 2020, received for PCT Application PCT/JP2020/001829, Filed on Jan. 21, 2020, 10 pages including English Translation.

*Primary Examiner* — Zoheb S Imtiaz
(74) *Attorney, Agent, or Firm* — Xsensus LLP

(57) ABSTRACT

An inverter is provided for driving a motor. A first capacitor, and a second capacitor including capacitors connected in series, are connected in parallel to a DC power supply. A switch circuit having switching elements is connected between the inverter and the second capacitor. A control circuit is provided for controlling the inverter and the switch circuit. The control circuit performs control to switch the switch circuit so as to supply current from the second capacitor to the inverter during 3-level operation, and supply current from both of the first capacitor and the second capacitor to the inverter during 2-level operation.

20 Claims, 16 Drawing Sheets

(56) References Cited

U.S. PATENT DOCUMENTS

| | | | |
|---|---|---|---|
| 2014/0233290 A1* | 8/2014 | Spanos | H02M 7/487 363/131 |
| 2014/0307489 A1* | 10/2014 | Kidera | H02M 7/493 363/40 |

FOREIGN PATENT DOCUMENTS

| | | |
|---|---|---|
| JP | 2017-93039 A | 5/2017 |
| JP | 2018-93610 A | 6/2018 |

* cited by examiner

POWER CONVERSION DEVICE

CROSS-REFERENCE TO RELATED APPLICATION

The present application is based on PCT filing PCT/JP2020/001829, filed Jan. 21, 2020, the entire contents of which is incorporated herein by reference.

TECHNICAL FIELD

The present disclosure relates to a power conversion device.

BACKGROUND ART

Some of conventional power conversion devices have a circuit configuration as disclosed in Patent Document 1, for example. In this conventional technology, operation of an inverter can be performed while being selected and switched between 2-level operation and 3-level operation in order to reduce loss in the inverter.

CITATION LIST

Patent Document

Patent Document 1: Japanese Patent No. 5386640

SUMMARY OF THE INVENTION

Problems to be Solved by the Invention

As described above, in some conventional inverter devices, the inverter is operated while being selected and switched between 2-level operation and 3-level operation in order to reduce loss in only the inverter. However, reduction for total loss including loss in a load (e.g., motor) connected to the inverter is not sufficiently considered. Therefore, although loss in the inverter can be reduced, for example, high-frequency iron loss in a motor increases, thus causing a problem that total loss in the entire device increases.

In a case of an inverter device for traveling of an electric vehicle, in order to increase a traveling distance, it is necessary to reduce entire loss in the inverter and the motor through traveling patterns defined by a fuel efficiency standard called worldwide harmonized light duty driving test cycle (WLTC).

When the traveling patterns of WLTC are mapped on mutual characteristic between the rotational speed and torque of the motor (hereinafter, referred to as NT characteristic), it is found that the traveling patterns of WLTC include a lot of patterns in which the inverter and the motor operate in a low-current region. In this region, it is desirable that 3-level operation is performed so as to reduce both of switching loss in the inverter and harmonic iron loss in the motor, thus minimizing total loss, and also contribute to size reduction of the inverter.

Further, in such a conventional power conversion device, even in a case of performing 2-level operation, operation is performed using only 3-level operation capacitors connected in series, and therefore the capacitor size increases, resulting in a problem of hampering size reduction.

The present disclosure has been made to solve the above problem, and an object of the present disclosure is to provide a power conversion device that can reduce total loss of an inverter and a motor and enables size reduction of the inverter.

Solution to the Problems

A power conversion device according to the present disclosure includes: an inverter for driving a motor; a first capacitor, and a second capacitor including a plurality of capacitors connected in series to each other, the first capacitor and the second capacitor being connected in parallel to a DC power supply; a switch circuit having a plurality of switching elements and connected between the inverter and the second capacitor; and a control circuit for controlling the inverter and the switch circuit, wherein the control circuit performs control to switch the switch circuit on the basis of a torque command and a rotational speed command for the motor, so as to supply current from the second capacitor to the inverter during 3-level operation, and supply current from both of the first capacitor and the second capacitor to the inverter during 2-level operation.

Effect of the Invention

In the power conversion device according to the present disclosure, the inverter and the motor are controlled on the basis of an operation map for the inverter set in advance so as to minimize total loss of the inverter and the motor in accordance with voltage of the DC power supply for the inverter and the torque and the rotational speed of the motor, thus enabling reduction in total loss of the inverter and the motor.

In addition, the region for performing 3-level operation is limited to a low current region corresponding to a WLTC operation mode that influences the traveling distance of an electric vehicle, whereby size increase of the capacitors can be suppressed and the inverter can be downsized.

DESCRIPTION OF EMBODIMENTS

Embodiment 1

Figure 1:
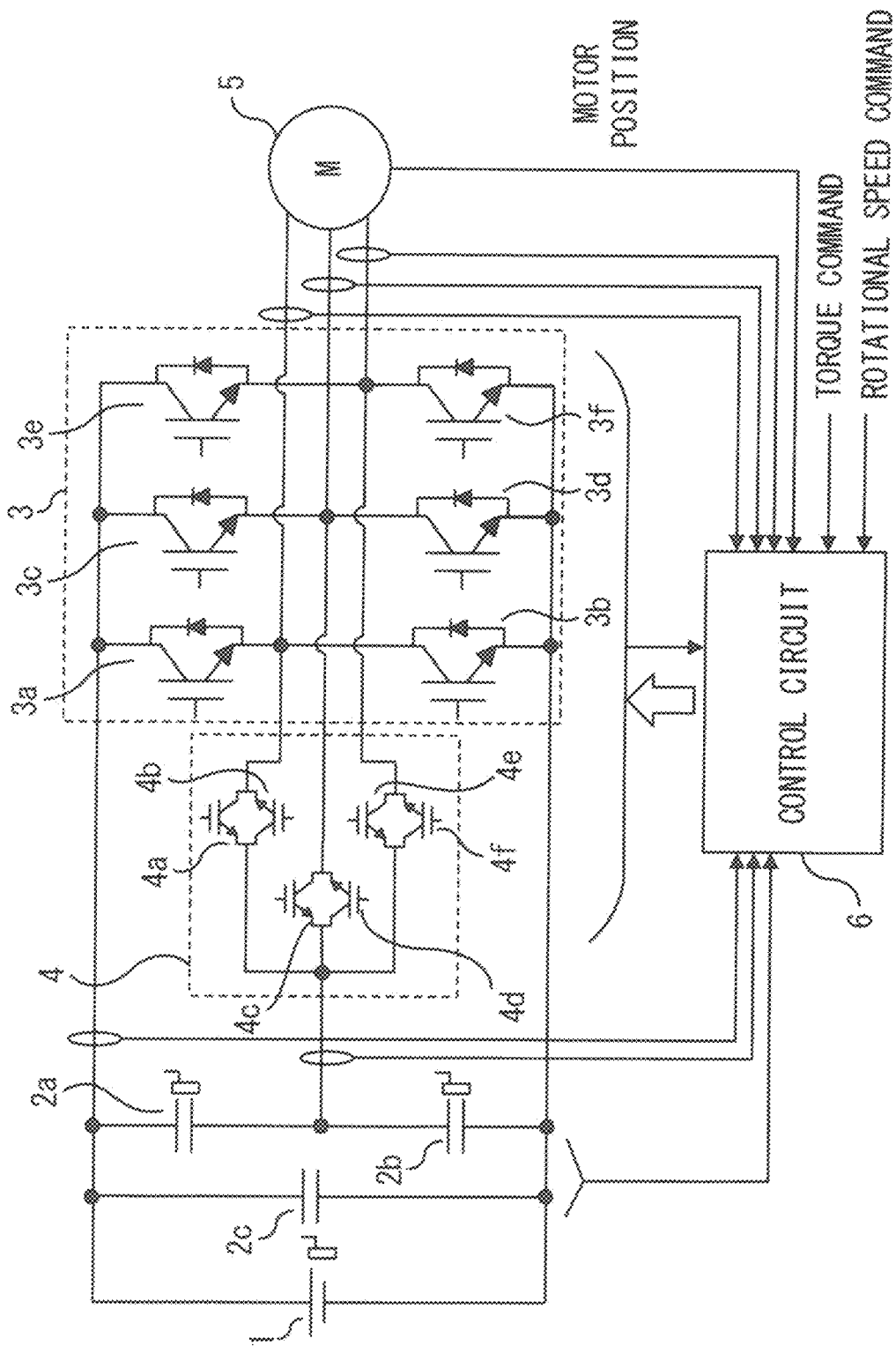
FIG. 1 is a configuration diagram of a power conversion device according to embodiment 1 of the present disclosure.

FIG. 1 is a configuration diagram of a power conversion device according to embodiment 1 of the present disclosure.

The power conversion device of embodiment 1 includes a three-phase inverter 3 for driving a motor 5, and in addition, a first capacitor 2c, and a pair of capacitors 2a, 2b (hereinafter, the capacitors 2a, 2b are referred to as second capacitors) connected in series to each other, are connected in parallel to a DC power supply 1. Further, the inverter 3 is connected to the DC power supply 1.

The inverter 3 is composed of six switching elements 3a to 3f formed by insulated gate bipolar transistors (IGBT) and diodes connected in antiparallel thereto, for example.

Between three AC output ends of the inverter 3 and the connection point of the second capacitor 2a, 2b, a switch circuit 4 is connected, and the switch circuit 4 is composed of six switching elements 4a to 4f formed by pairs of reverse-blocking IGBTs opposing each other.

Specifically, a pair of switching elements 4a, 4b are connected to the midpoint between the second capacitors 2a, 2b and the midpoint between a pair of switching elements 3a, 3b forming an arm of the inverter 3. Another pair of switching elements 4c, 4d are connected to the midpoint between the second capacitors 2a, 2b and the midpoint between a pair of switching elements 3c, 3d forming an arm of the inverter 3. Still another pair of switching elements 4e, 4f are connected to the midpoint between the second capacitors 2a, 2b and the midpoint between a pair of switching elements 3e, 3f forming an arm of the inverter 3. AC outputs of the inverter 3 are connected to the motor 5.

For calculating total loss including losses in the inverter 3 and the motor 5 during each of 2-level operation and 3-level operation, the control circuit 6 receives operation information such as voltage of the DC power supply 1, voltages and flowing currents of the second capacitors 2a, 2b, and temperatures of the inverter 3 and the switch circuit 4, from sensors (not shown) provided outside. In addition, the control circuit 6 receives information of phase currents and the rotational position of the motor 5, and further receives information of a torque command and a rotational speed command (information of NT characteristic) given from a high-order controller (not shown).

Then, on the basis of various kinds of information received as described above, in order to select and switch between 2-level operation and 3-level operation so as to minimize total loss of the inverter 3 and the motor 5, the control circuit 6 generates, in advance, an operation map (see FIG. 14 described later) in which information of a carrier frequency of the inverter 3 and regions for selecting whether to perform 2-level operation or 3-level operation, for reducing loss in accordance with operation states of the inverter 3 and the motor 5, are defined on the NT characteristic of the motor 5, and registers information of the operation map in a storage device (not shown).

In performing drive control of the motor 5, the control circuit 6 refers to the operation map, to determine the carrier frequency of the inverter 3 and whether to perform 2-level operation or 3-level operation, on the basis of information of command values for the torque and the rotational speed of the motor 5, temperature information, and information of currents flowing through the second capacitors 2a, 2b, thereby controlling operations of the inverter 3 and the switch circuit 4.

Figure 2:
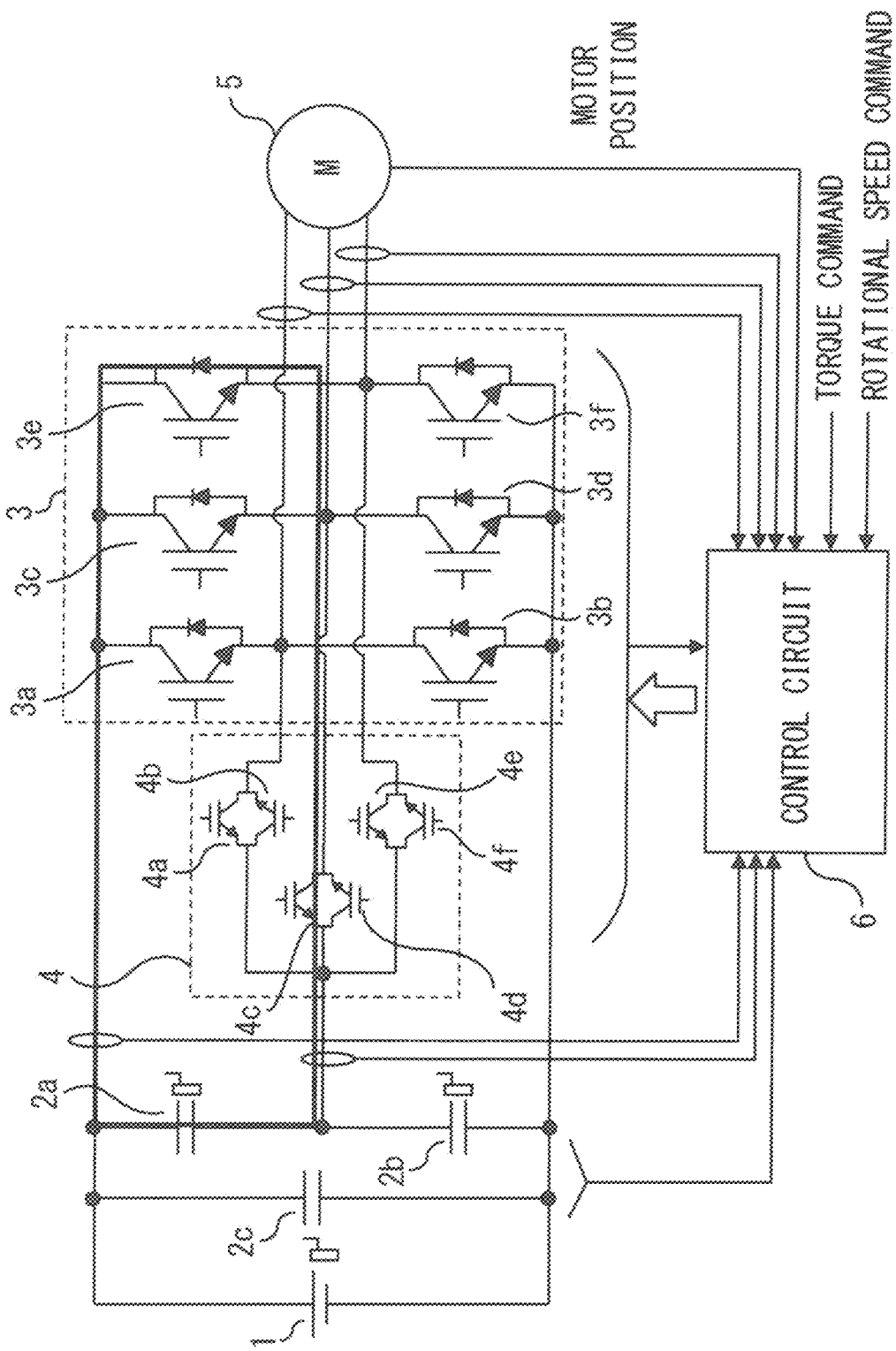
FIG. 2 illustrates a current route during 3-level operation according to embodiment of the present disclosure.
Figure 3:
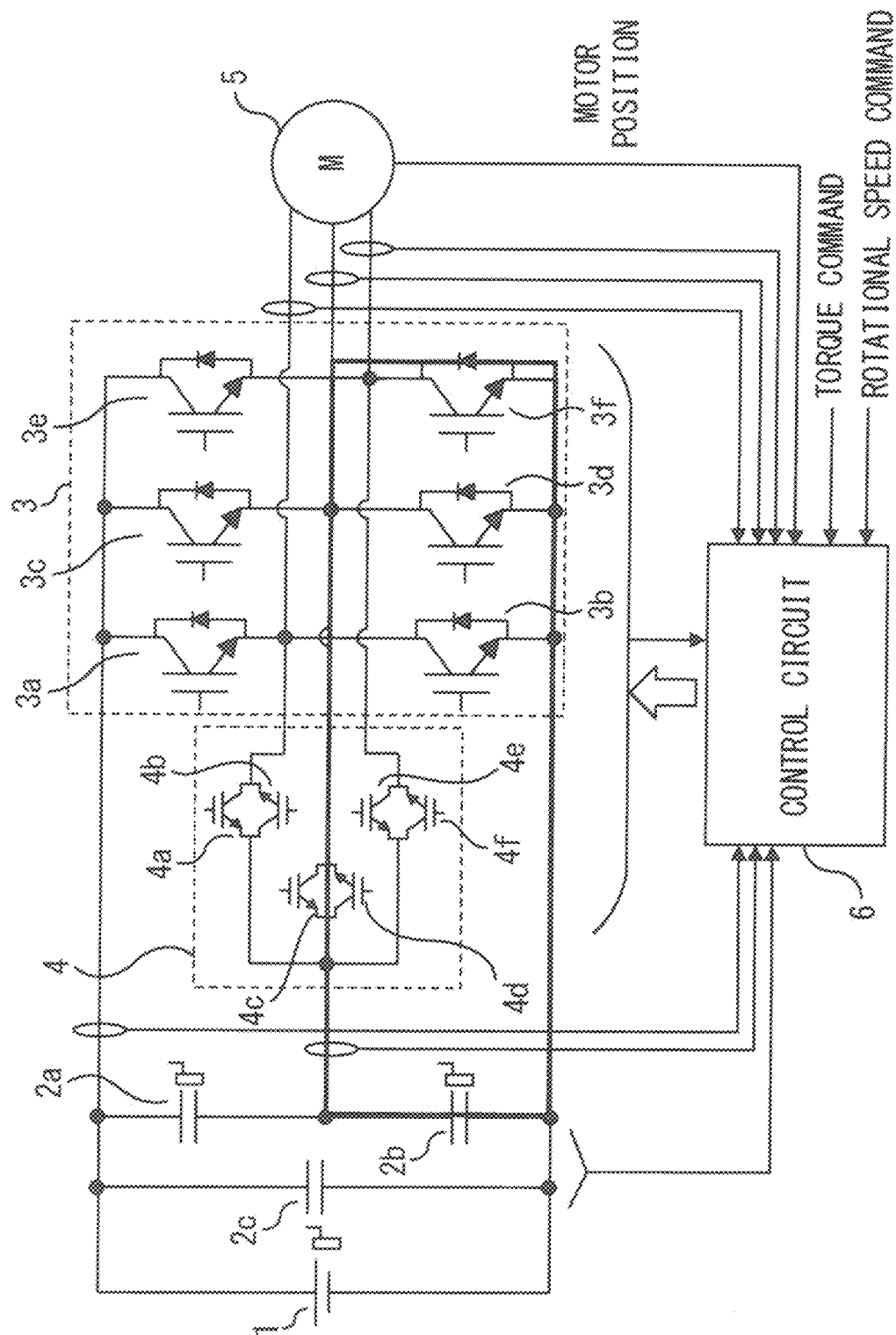
FIG. 3 illustrates another current route during 3-level operation according to embodiment 1 of the present disclosure.
Figure 4:
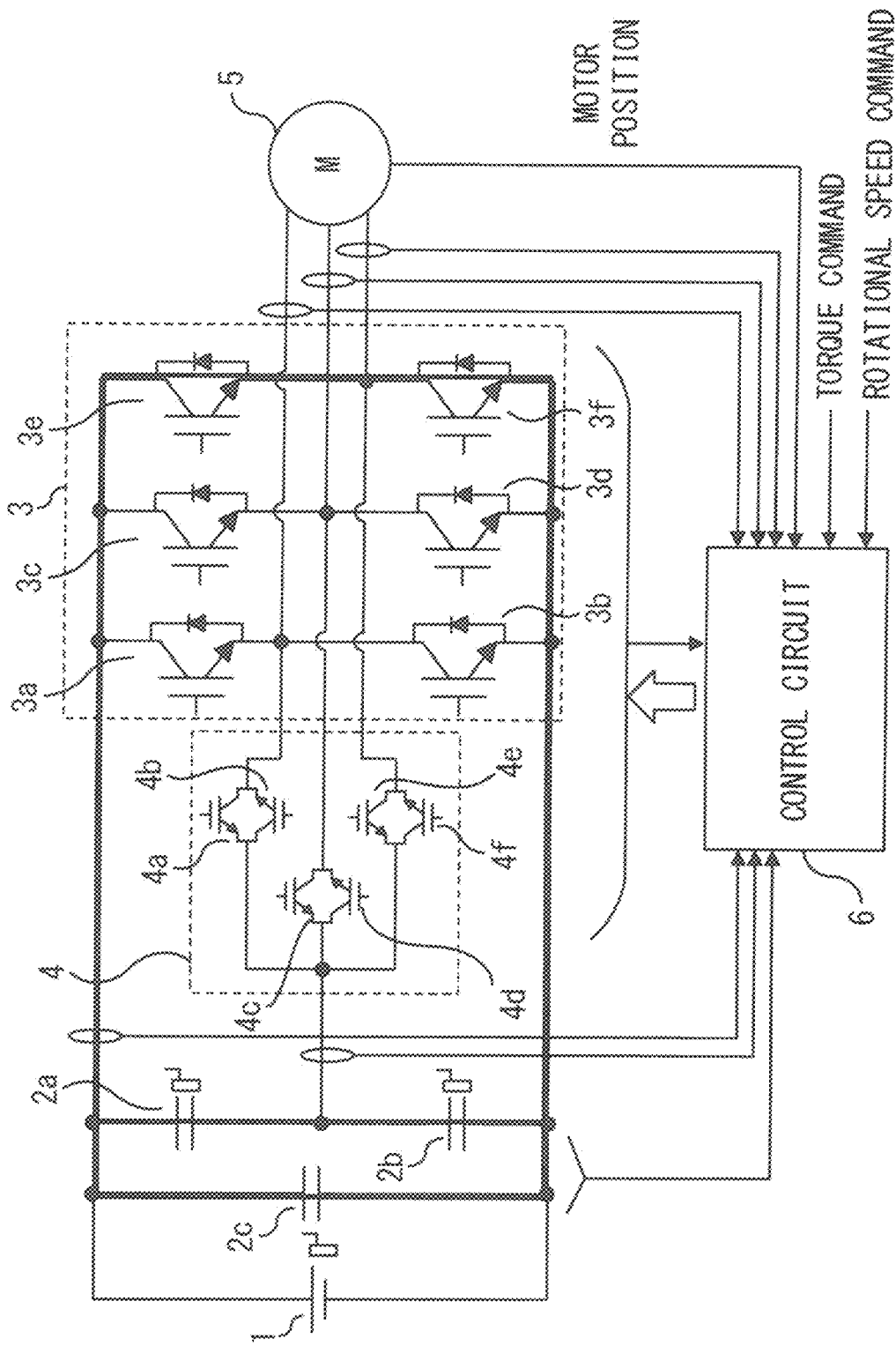
FIG. 4 illustrates still another current route during 3-level operation according to embodiment 1 or the present disclosure.
Figure 5:
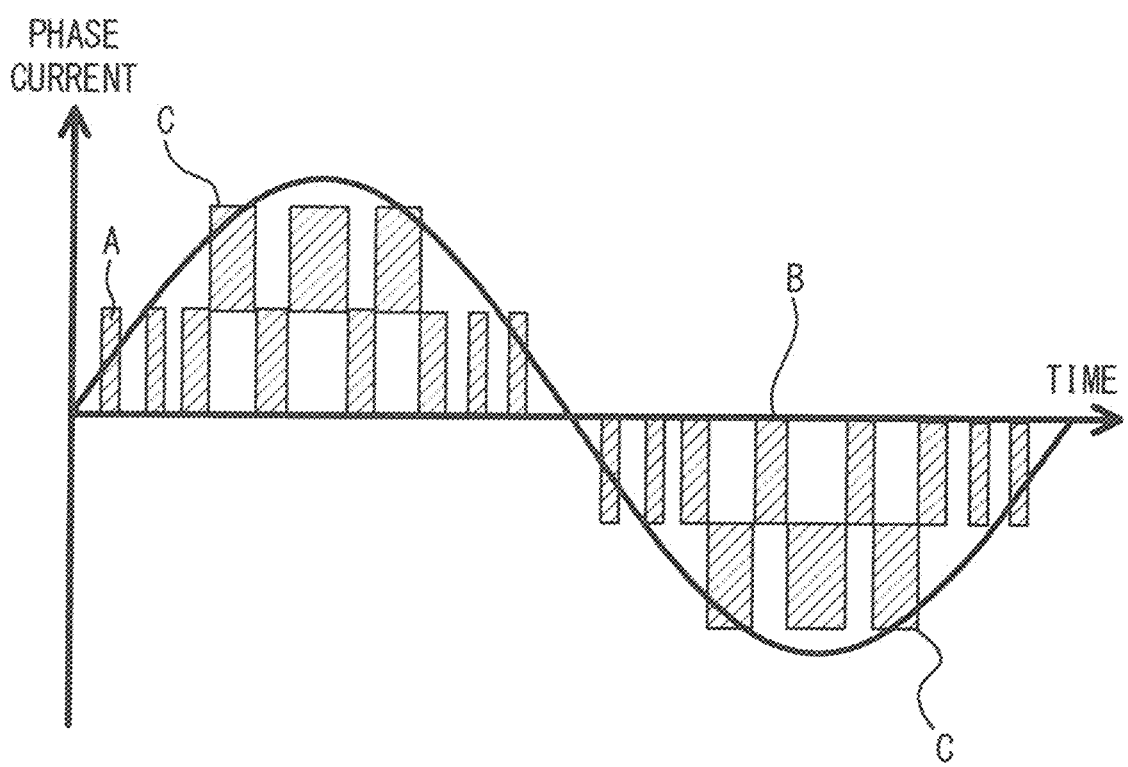
FIG. 5 is a waveform diagram snowing a change relationship between switching voltage of an inverter and phase current of a motor while a current route changes during 3-level operation in embodiment 1 of the present disclosure.

FIG. 2 to FIG. 4 each show a route of current for one phase flowing through the first and second capacitors 2a to 2c in a case where the inverter 3 performs 3-level operation (the current route is indicated by a thick solid line in the drawings). FIG. 5 shows a change relationship between switching voltage of the inverter 3 and phase current for one phase in the motor 5 in this case.

At a low current phase where the phase current of the motor m is small, the switch circuit 4 is turned on so that currents flow through the second capacitors 2a, 2b (states shown in FIG. 2 and FIG. 3 and indicated by (A) and (Br in FIG. 5). On the other hand, at a high current phase where the phase current of the motor 5 is great, the switch circuit 4 is turned off so that currents flow through both the first capacitor 2c and the second capacitors 2a, 2b (state shown in FIG. 4 and indicated by (C) in FIG. 5).

When a command value for the motor phase current of the inverter 3 increases in accordance with the torque command and the rotational speed command for the motor 5, the inverter 3 switches from 3-level operation to 2-level operation through control by the control, circuit 6. In this case, the switch circuit 4 is turned off so that currents flow through both the first capacitor 2c and the second capacitors 2a, 2b. That is, the current route shown in FIG. 4 arises. When the operation is switched to the 2-level operation, ideally, currents flowing through the capacitors 2a to 2c are divided at a capacitance ratio of the capacitance of the first capacitor 2c and the series capacitance of the second capacitors 2a, 2b.

In general, the size of each capacitor 2a to 2c is proportional to the capacitance value thereof, and the capacitance value influences torque ripple in the motor 5 or the withstand voltage of the inverter 3. Therefore, the capacitance values need to be set so as to reduce voltage ripple. In addition, the capacitance values need to be defined for reducing the internal resistance so that the temperature of each capacitor generating heat due to current ripple does not exceed an allowable temperature.

Figure 6:
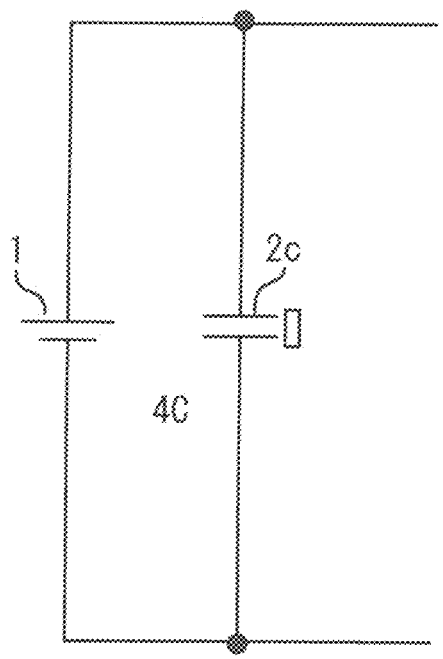
FIG. 6 is a circuit diagram showing a capacitor configuration needed in a case where the inverter performs only 2-level operation.
Figure 7:
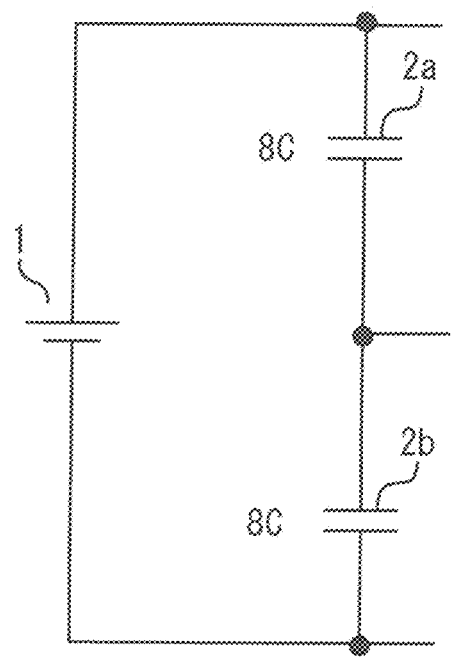
FIG. 7 is a circuit diagram showing a capacitor configuration needed in a case where the inverter performs only 3-level operation.
Figure 8:
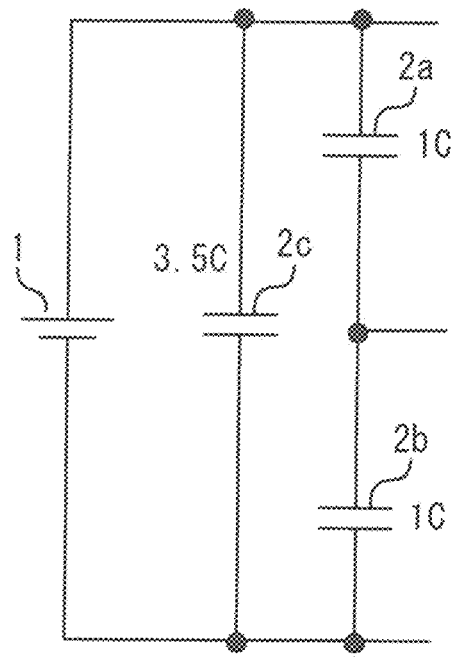
FIG. 8 is a circuit diagram showing a capacitor configuration needed in a case where the inverter performs operation by switching between 2-level operation and 3-level operation (corresponding to the present disclosure).

FIG. 6 is a circuit diagram showing a capacitor configuration needed in a case where the inverter 3 performs only 2-level operation, FIG. 7 is a circuit diagram showing a capacitor configuration needed in a case of performing only 3-level operation, and FIG. 8 is a circuit diagram showing a capacitor configuration needed in a case of performing operation by switching between 2-level operation and 3-level operation as in the present disclosure.

Here, for simplifying description, the capacitor capacitance needed for causing the maximum current to flow through the inverter 3 is assumed to be 4 C.

In a case of performing only 2-level operation, as shown in FIG. 6, the first capacitor 2c is connected in parallel to the DC power supply 1. Therefore, the capacitance of the first capacitor 2c is 4 C.

In a case of performing only 3-level operation, as shown in GIG. 7, the second capacitors 2a, 2b are connected in parallel to the DC power supply 1. Therefore, the capacitance of each capacitor 2a, 2b needs to be 8 C and thus the total 16 C.

In a case of performing operation by switching between 2-level operation and 3-level operation as in the present disclosure, as shown in FIG. 8, the first capacitor 2c and the second capacitors 2a, 2b are connected in parallel to the DC power supply 1. Therefore, the capacitance of the first capacitor 2c needs to be 3.5 C and the capacitances of the second capacitors 2a, 2b need to be 1 C, and thus the total is 5.5 C.

Accordingly, in a case where the capacitor capacitance needed for causing the maximum current to flow is 4 C and the volume is assumed to be proportional to the capacitance, the size increase ratio of the 3-level configuration (FIG. 7) relative to the 2-level configuration (FIG. 6) is 4.0, whereas the size increase ratio of the configuration in the present disclosure (FIG. 8) relative to the 2-level configuration (FIG. 6) is 1,375. That is, even in the case of using the configuration of the present disclosure which enables switching between 2-level operation and 3-level operation, increase in the capacitor size can be suppressed.

Figure 9:
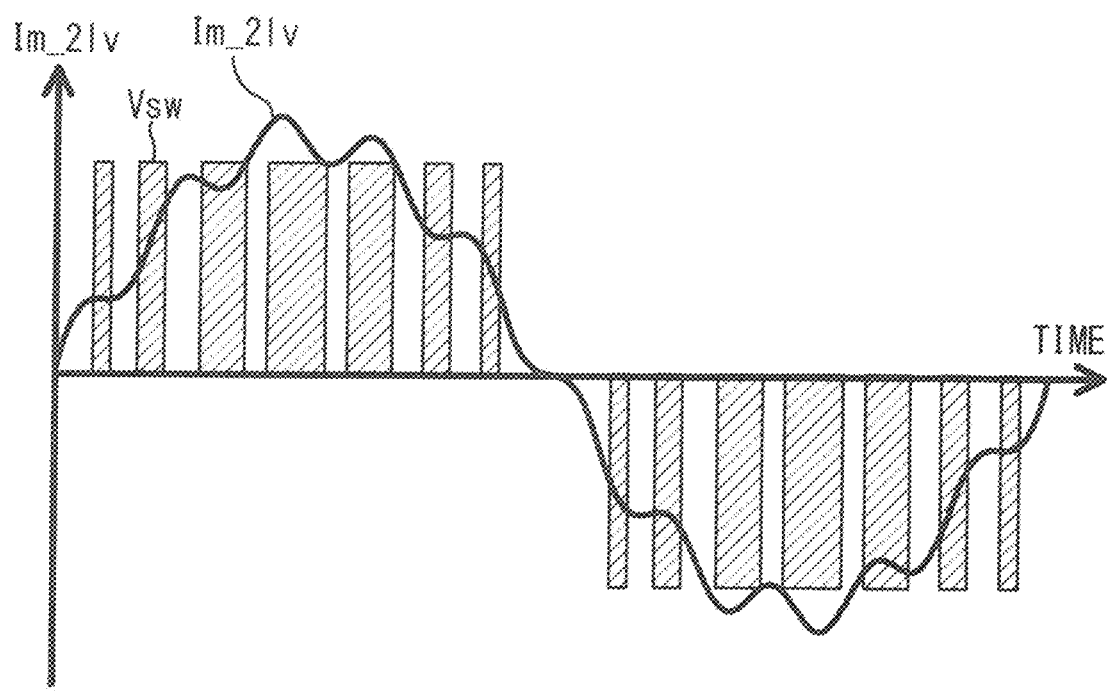
FIG. 9 is a waveform diagram showing change over time of phase current of the motor in a case where the inverter performs 2-level operation in embodiment 1 of the present disclosure.
Figure 10:
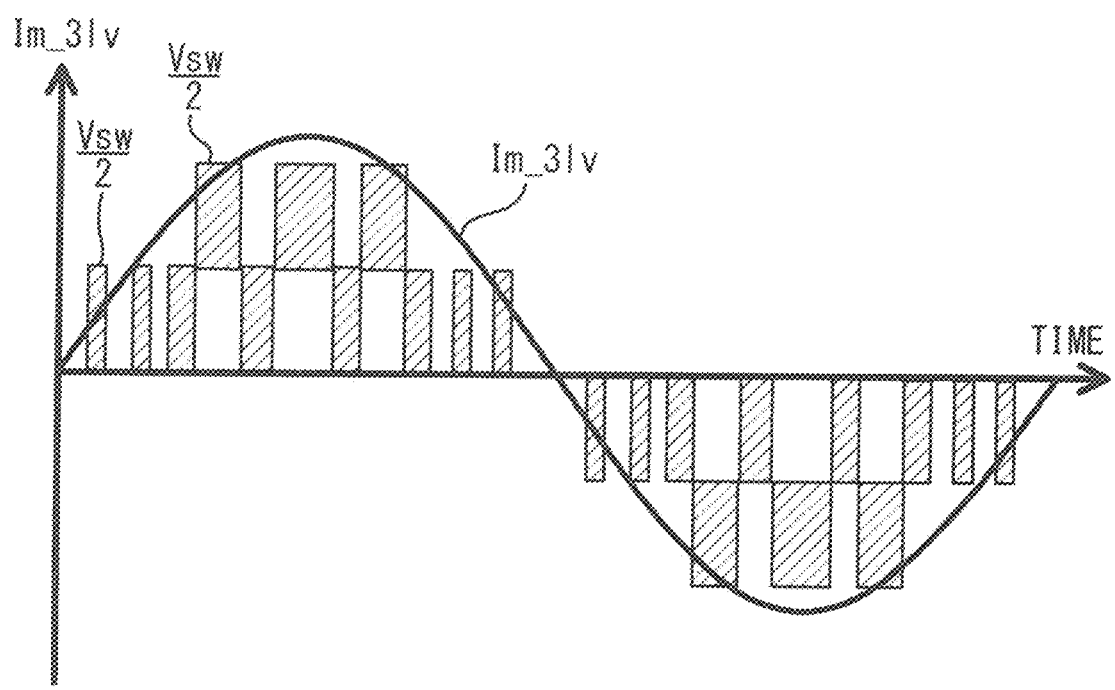
FIG. 10 is a waveform diagram showing change over time of phase current of the motor in a case where the inverter performs 3-level operation in embodiment 1 of the present disclosure.

FIG. 9 is a waveform diagram showing change over time of phase current Im_2lv in the motor 5 in a case where the inverter performs 2-level operation, and FIG. 10 is a waveform diagram showing change over time of phase current Im_3lv of the motor 5 in a case where the inverter performs 3-level operation. In these drawings, change in switching voltage of the inverter 3 is also shown together.

In comparison between the waveform of the phase current Im_2lv during 2-level operation and the waveform of the phase current Im_3lv during 3-level operation, the current waveform during 2-level operation is distorted as compared to the current waveform during 3-level operation. The reason is as follows, Regarding voltage for generating current, in the case of 2-level operation, current is controlled using voltage $V_{SW}$ ($=2 \times V_{SW}/2$) which is two times the voltage in the case of 3-level operation. As a result, harmonic iron loss in the motor 5 is greater during 2-level operation than during 3-level operation. This tendency becomes higher as the rotational speed of the motor 5 increases. That is, as the rotational speed of the motor 5 increases, the number of times of switching per cycle of phase current decreases, so that distortion increases and thus harmonic iron loss during 2-level operation becomes greater than during 3-level operation.

Figure 11:
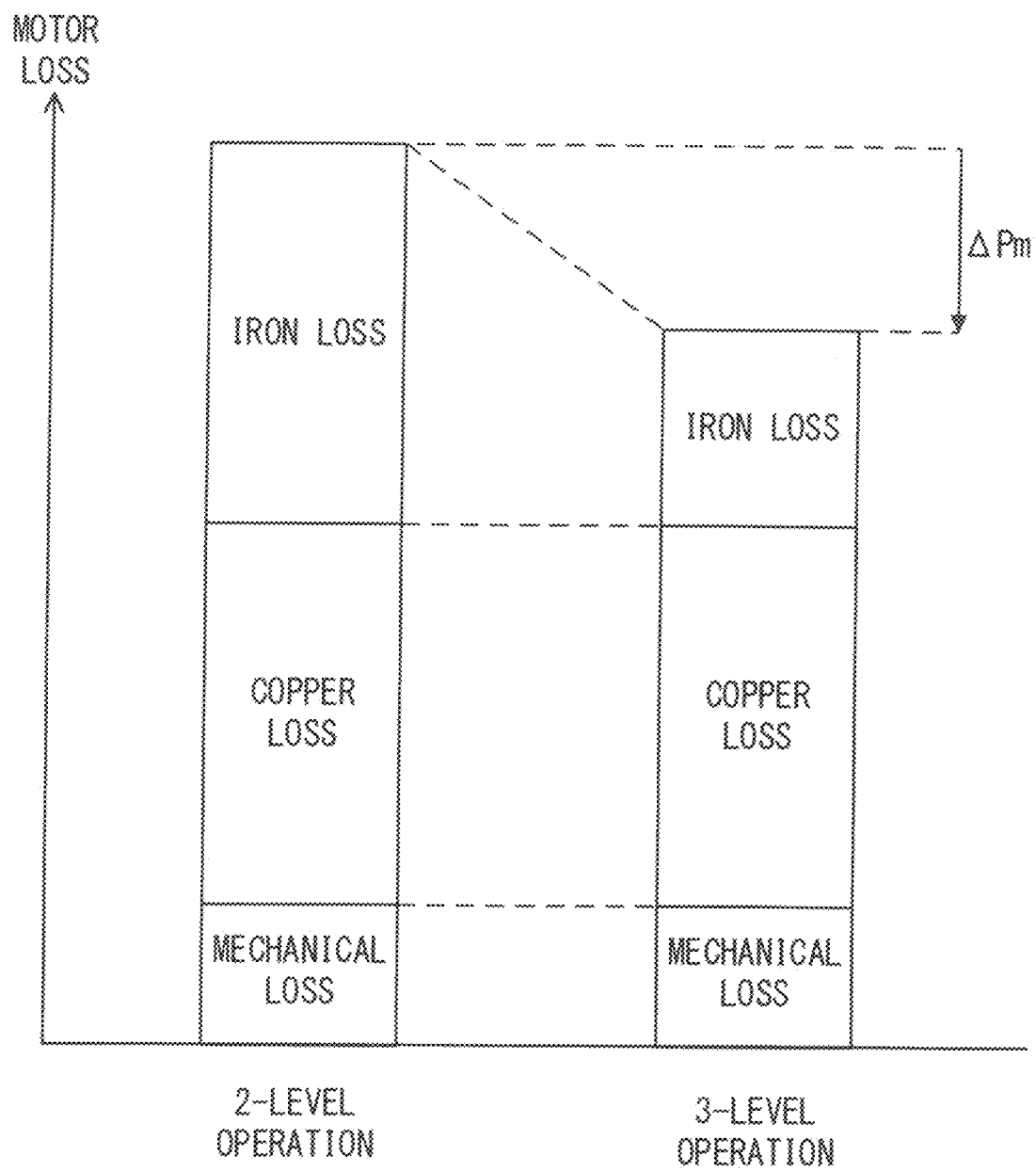
FIG. 11 illustrates difference in motor loss, between 2-level operation and 3-level operation, in embodiment 1 of the present disclosure.
Figure 12:
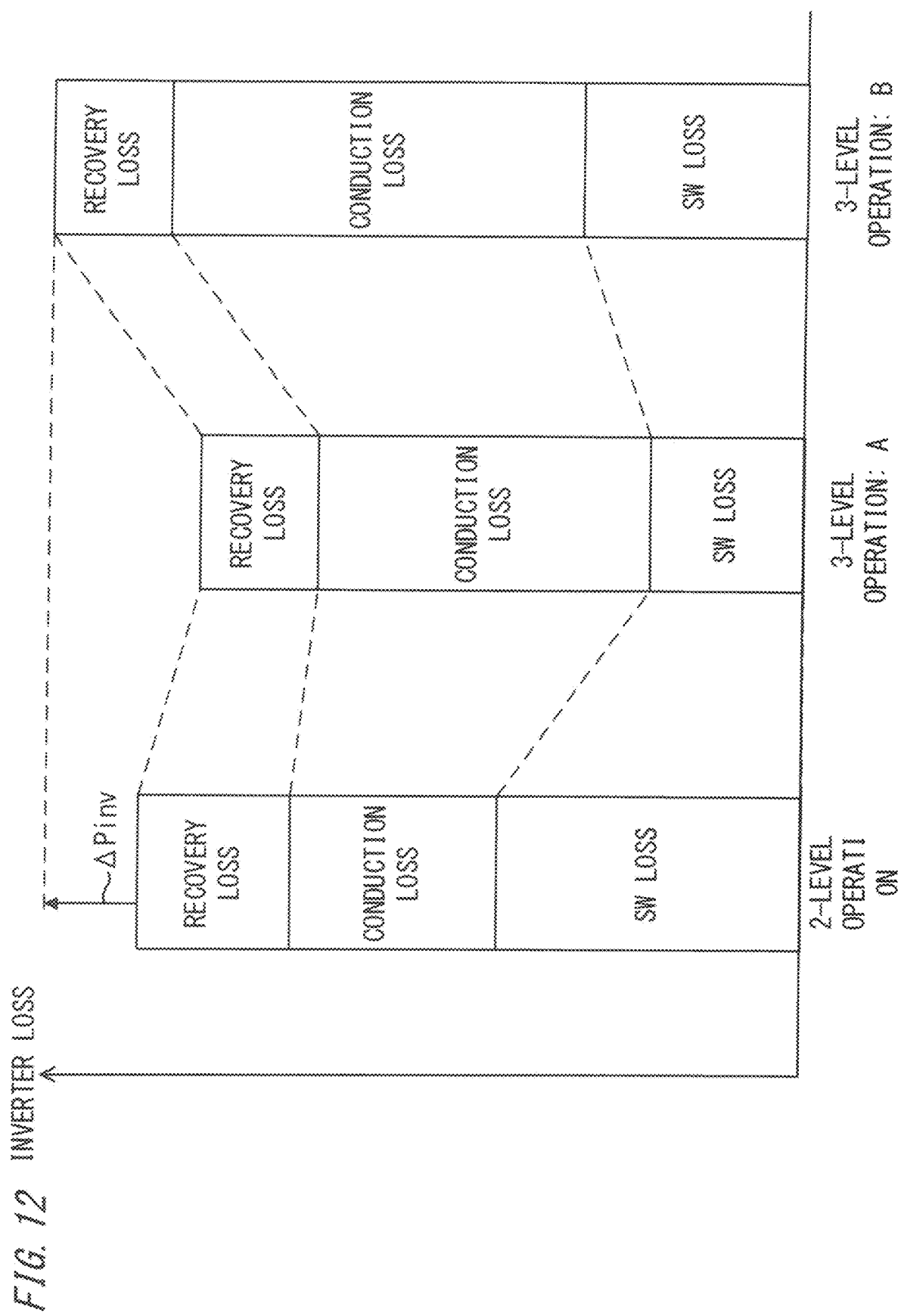
FIG. 12 illustrates difference in inverter loss, between 2-level operation and 3-level operation, in embodiment 1 of the present disclosure.

FIG. 11 shows motor losses in 2-level operation and in 3-level operation, and FIG. 12 snows inverter losses in 2-level operation and 3-level operation.

Here, the motor loss includes iron loss, copper loss, and mechanical loss due to driving of the motor 5, and in particular, the influence of high-frequency iron loss due to phase current change is great. The inverter loss includes switching loss, conduction loss, and recovery loss of voltage recovery, due to ON/OFF operations of the switching elements 3a to 3f when the inverter is driven.

As is found from these drawings, regarding the motor loss (FIG. 11), since harmonic iron loss in the motor 5 during 3-level operation is smaller than during 2-level operation, the motor loss during 3-level operation becomes smaller than during 2-level operation. The reduction amount of loss when the operation is switched from 2-level operation to 3-level operation in this case is defined as ΔPm (the downward direction off the vertical axis is positive).

On the other hand, regarding the inverter loss (FIG. 12), it cannot be said that loss during 3-level operation is always smaller than during 2-level operation. That is, in accordance with the amount of current flowing through the inverter 3 during 3-level operation and the characteristics of elements composing the added switch circuit 4, depending on the operation state of the inverter 3, inverter loss may decrease (case indicated by 3-LEVEL OPERATION A in FIG. 12), or conversely, inverter loss may increase (case indicated by 3-LEVEL OPERATION B in FIG. 12), when the operation is switched from 2-level operation to 3-level operation. The increase amount of loss when the operation is switched from 2-level operation to 3-level operation in the case of FIG. 12(B) indicated by 3-LEVEL OPERATION B in FIG. 12 is defined as ΔPinv (the downward direction of the vertical axis is positive).

Therefore, in order to minimize loss in the entire device including motor loss and inverter loss, a reduction effect ΔP (=ΔPm+ΔPinv) for the total loss of these losses needs to be maximized.

Figure 13:
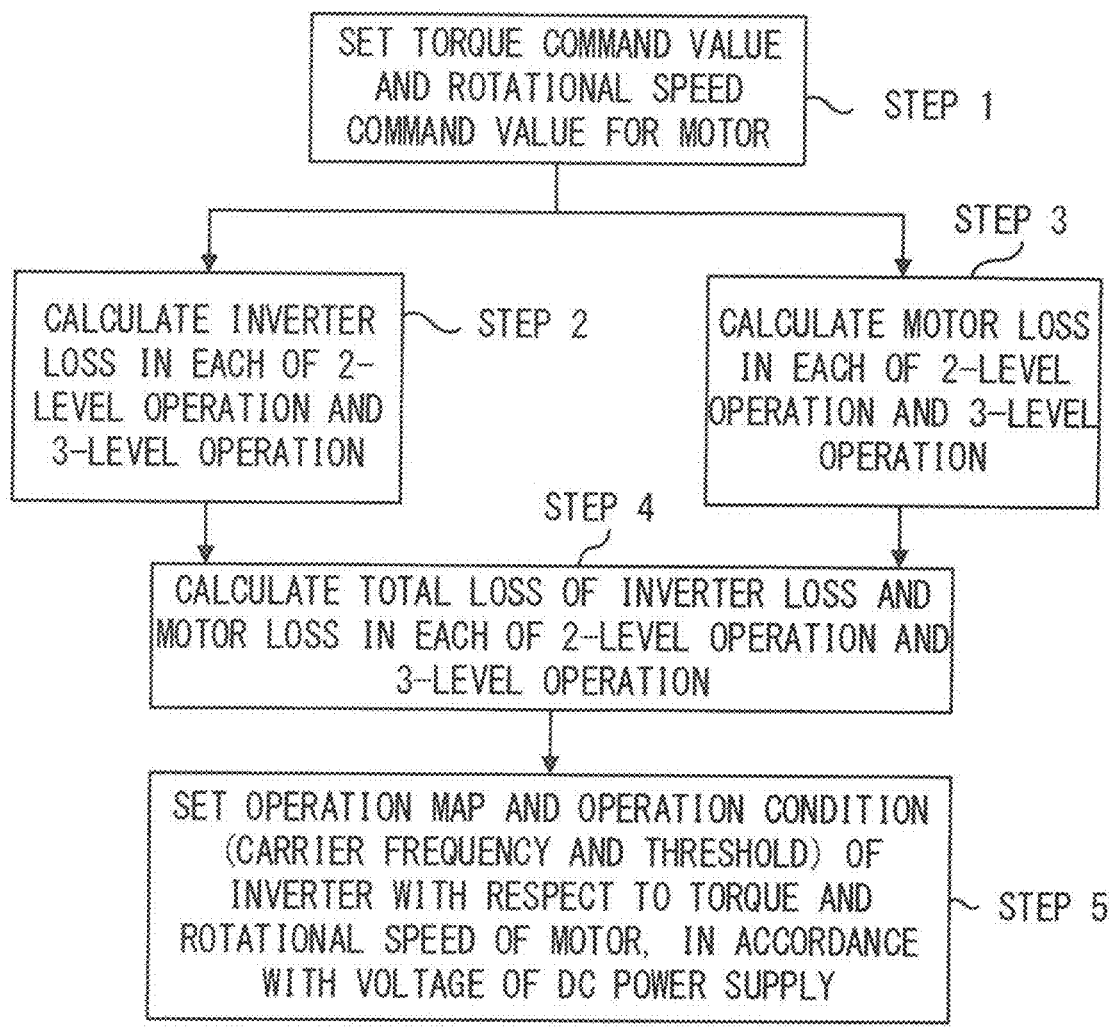
FIG. 13 is a flowchart showing a processing procedure for generating, in advance, an operation map for minimizing total loss in an entire device including motor loss and inverter loss, in embodiment 1 of the present disclosure.

FIG. 13 is a flowchart showing a processing procedure for generating an operation map to be registered in the control circuit 6, in advance, in order to minimize the total loss in the entire device including motor loss and inverter loss.

First, the command values for the torque and the rotational speed needed for the motor 5 are set (step 1), and loss that occurs in each of the inverter 3 and the motor 5 during 2-level operation and during 3-level operation in that case is calculated (steps 2, 3). Parameters for calculation are voltage of the DC power supply, phase current, a carrier frequency, a modulation factor, a power factor, and a temperature.

Specifically, regarding inverter loss, while parameters of voltage of the DC power supply 1, the phase current of the motor 5, the modulation factor, the carrier frequency, the power factor in each of 2-level operation and 3-level operation, and the temperature are changed, inverter loss in each of 2-level operation and 3-level operation is calculated (step 2). Regarding motor loss, while parameters of copper loss of the motor 5, fundamental-frequency iron loss, high-frequency iron loss, mechanical loss, and the temperature are changed, motor loss in each of 2-level operation and 3-level operation is calculated (step 3).

Next, by combining the inverter loss and the motor loss obtained while the parameters are changed, the total loss of the inverter 3 and the motor 5 is calculated (step 4). Subsequently, an operation condition of the inverter 3 for minimizing the total loss (in other words, maximizing the reduction effect ΔP for total loss) is calculated, the operation condition for minimizing the total loss of the inverter 3 and the motor 5 is mapped on the NT characteristic of the motor 5, and a region in which 3-level operation is performed is limited on the basis of the characteristic of the torque and the rotational speed needed during WLTC-mode traveling (step 5).

That is, an operation map (FIG. 14) is generated in which information of the carrier frequency of the inverter 3 and information of a threshold Sh1 as a border between a region for performing 2-level operation and a region for performing 3-level operation, for reducing the total loss in accordance with voltage of the DC power supply 2 and the operation states of the inverter 3 and the motor 5, are defined on the NT characteristic of the motor 5, and the operation map is stored in advance in a storage device (not shown) provided to the control circuit 6, or the like.

In actual driving for the motor 5, the control circuit 6 refers to the operation map generated in advance as described above, to determine the carrier frequency of the inverter 3 and whether to perform 2-level operation or 3-level operation, on the basis of information of the command values for the torque and the rotational speed of the motor 5, temperature information, and information of currents flowing through the second capacitors 2a, 2b, and thereby controls operations of the inverter 3 and the switch circuit 4. In the determination for whether to perform 2-level operation or 3-level operation, for example, if the reduction amount of harmonic iron loss in the motor 5 when the inverter 3 performs 3-level operation is greater than the increase amount of loss in the inverter 3 when the inverter 3 is switched from 2-level operation to 3-level operation, the control circuit 6 determines to cause the inverter 3 to perform 3-level operation.

Figure 14:
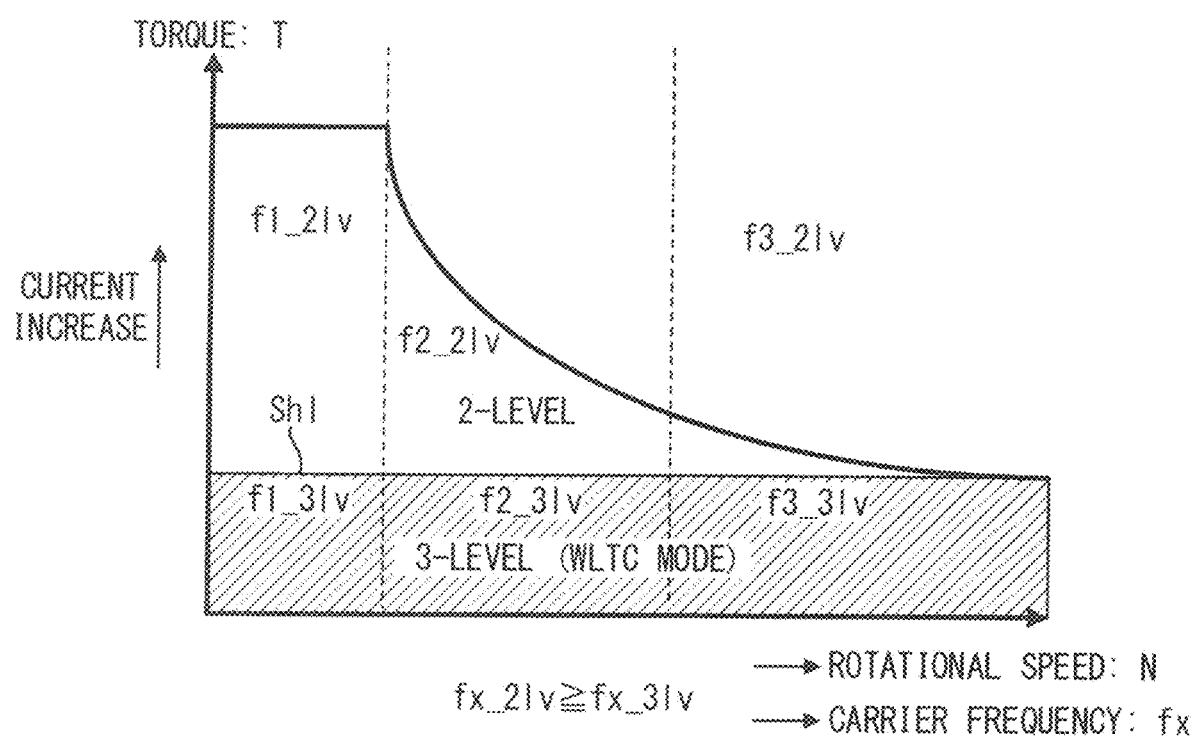
FIG. 14 illustrates an example of an operation map generated on the basis of the flowchart shown in FIG. 13 in embodiment 1 of the present disclosure.

FIG. 14 illustrates an example of the operation map in which regions for selecting whether to perform 2-level operation or 3-level operation are defined on the NT characteristic representing the relationship between a rotational speed N and torque T of the motor 5 on the basis of the above process shown in the flowchart in FIG. 13.

In FIG. 14, Sh1 denotes a threshold for selecting and switching between 3-level operation and 2-level operation. In FIG. 14, Tmax denotes a curve representing the maximum torque that can be taken with respect to the rotational speed N of the motor 5.

Here, in the WLTC mode, required torque for the motor 5 is not greater than the threshold Sh1 and therefore 3-level operation is selected. However, this region is lower than the maximum operation point for the inverter 3 and the motor 5 that covers the entire operation region of the vehicle, and thus is a low current region.

That is, the reason why 3-level operation is performed during WLTC-mode traveling is as follows. Even if efficiency is attempted to be enhanced over the entire region on the NT characteristic, the fuel efficiency improvement effect is small in relation to frequency, and in contrast, limiting 3-level operation to an operation region effective for fuel efficiency and suppressing size increase of the switch circuit 4 and the series capacitors 2a, 2b to be added, can contribute to reduction of the total loss and reduction of size and cost of the entire device.

In addition, as is found from FIG. 14, when torque of the motor 5 increases to exceed the threshold Sh1 under the same rotational speed, the operation is switched from 3-level operation to 2-level operation. In the drawing, the threshold Sh1 is shown as a substantially horizontal line. However, in a case where the threshold Sh1 is represented by a line sloped so as to lower toward the right side, when the rotational speed of the motor 5 increases to exceed the threshold Sh1 under the same torque, the operation is switched from 3-level operation to 2-level operation. In the drawing, the threshold Sh1 is shown as one line. However, as a matter of course, operation states may be set with hysteresis imparted to the threshold Sh1 so as to stabilize operation, and description thereof is omitted.

Regarding the carrier frequency, while the rotational speed N of the motor 5 is increased, each of a carrier frequency fx_3lv during 3-level operation and a carrier frequency fx_2lv during 2-level operation also increases.

That is, the carrier frequency during 3-level operation increases in the order of f1_3lv, f2_3lv, then fx_3lv. The carrier frequency during 2-level operation increases in the order of f1_2lv, f2_2lv, then f3_2lv.

Further, in comparison between the carrier frequency fx_3lv during 3-level operation and the carrier frequency fx_2lv during 2-level operation, irrespective of the rotational speed N of the motor 5, the carrier frequency fx_3lv during 3-level operation is set to be lower than the carrier frequency fx_2lv during 2-level operation, i.e., fx_2lv>fx_3lv is satisfied. The reason is as follows. During 3-level operation, operation is performed only in the low current region in which torque T is small. Therefore, inverter loss is small and distortion of phase current of the motor 5 is smaller than during 2-level operation (FIG. 10). Thus, as compared to 2-level operation, harmonic iron loss is reduced so that motor loss is assuredly reduced, whereby the total loss of the inverter 3 and the motor 5 can be reduced as a whole.

Regarding the carrier frequency during 2-level operation, if the switching frequency of the inverter 3 is decreased, switching loss is reduced but distortion of the phase current of the motor 5 increases, so that, conversely, high-frequency iron loss of the motor 5 increases. Thus, the carrier frequency is a parameter having contradiction between the inverter 3 and the motor 5, and therefore it is necessary to perform setting so as to minimize the total loss of the inverter 3 and the motor 5 while ensuring controllability for the motor 5.

Figure 15:
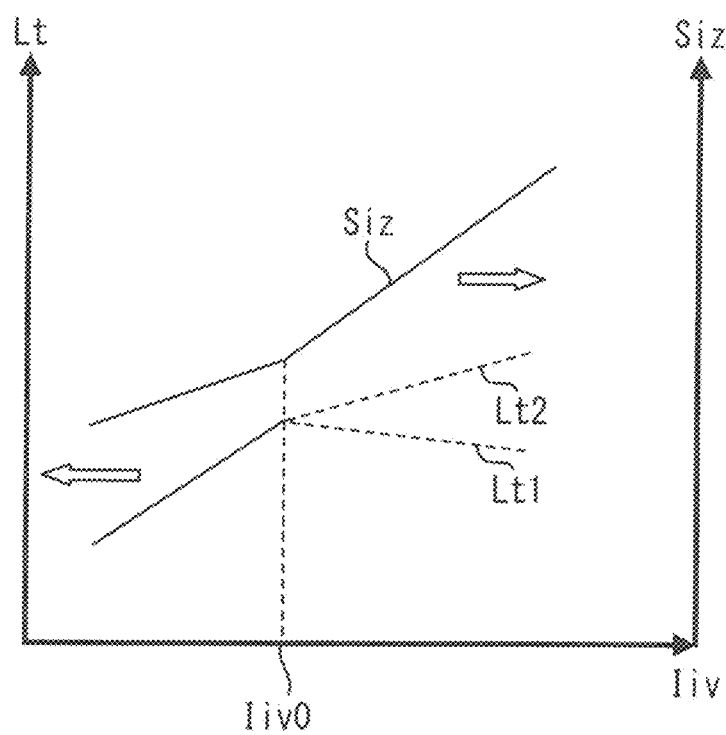
FIG. 15 is a characteristic graph schematically showing the relationship of total loss (left vertical axis) of the inverter and the motor, and the size (right vertical axis) of the inverter, with respect to inverter current (horizontal axis), in embodiment 1 of the present disclosure.

FIG. 15 is a characteristic graph schematically showing the relationship of total loss Lt (left vertical axis) of the inverter 3 and the motor 5, and a size Siz for cost) (right vertical axis) of the inverter 3, with respect to current Iiv (horizontal axis) flowing through the inverter 3.

Here, the size Siz of the inverter 3 refers to the sizes of the switch circuit 4 and the second capacitors 2a, 2b to be added, and the size of a gate drive circuit for driving the switch circuit 4. In addition, if these sizes are increased, the cost also increases accordingly.

In order to make a configuration that enables switching between 2-level operation and 3-level operation, it is necessary to add components such as the switch circuit 4, the second capacitors 2a, 2b, and a gate drive circuit therefor to an inverter having a configuration for performing 2-level operation, and in addition, it is necessary to ensure withstand voltages for these components in a case where current Iiv flowing through the inverter 3 increases, and therefore the size Siz increases in accordance with the current amount.

On the other hand, regarding loss, in a case where current Iiv of the inverter 3 increases, as described above with reference to FIG. 12, when the operation is switched from 2-level operation to 3-level operation, there is a case where inverter loss decreases and the total loss Lt of the inverter 3 and the motor 5 is reduced (line indicated by Lt1 in FIG. 15), and also there is a case where, conversely, inverter loss increases and the total loss increases (line indicated by Lt2 in FIG. 6).

Therefore, in the region in which the current amount of the inverter 3 is smaller than Iiv0 in the graph, it is possible to reduce the total loss Lt without unnecessarily increasing the size Siz of the inverter 3.

As described above, the power conversion device according to embodiment 1 of the present disclosure is configured such that operation of the inverter 3 can be selected and switched between 2-level operation and 3-level operation. In a case where the inverter 3 performs 3-level operation, a state in which both of switching loss in the inverter 3 and harmonic iron loss in the motor 5 can be reduced, exists.

Using this fact, an operation map in which information of the carrier frequency and information of the threshold Sh1 as a border between a region for performing 2-level operation and a region for performing 3-level operation are defined on the NT characteristic of the motor 5 so as to reduce the total loss of the inverter 3 and the motor 5, is generated in advance and is stored in the control circuit 6. By selecting operation of the inverter between 2-level operation and 3-level operation on the basis of the operation map, it is possible to perform operation with the carrier frequency set so as to minimize the total loss of the inverter 3 and the motor 5.

In addition, as components needed for minimizing the total loss of the inverter 3 and the motor 5 during the WLTC-mode traveling serving as a criterion for fuel efficiency of the vehicle and for enabling switching between 2-level operation and 3-level operation, the first capacitor 2c and the second capacitors 2a, 2b connected in series to each other are connected in parallel to the DC power supply 1, whereby size increase can be suppressed and thus the inverter 3 can be downsized.

Embodiment 2

In the above power conversion device of embodiment 1, the switch circuit 4 added to the inverter 3 is configured using reverse-blocking IGBTs in order to make a configuration capable of selecting and switching operation of the inverter 3 between 2-level operation and 3-level operation.

Figure 16:
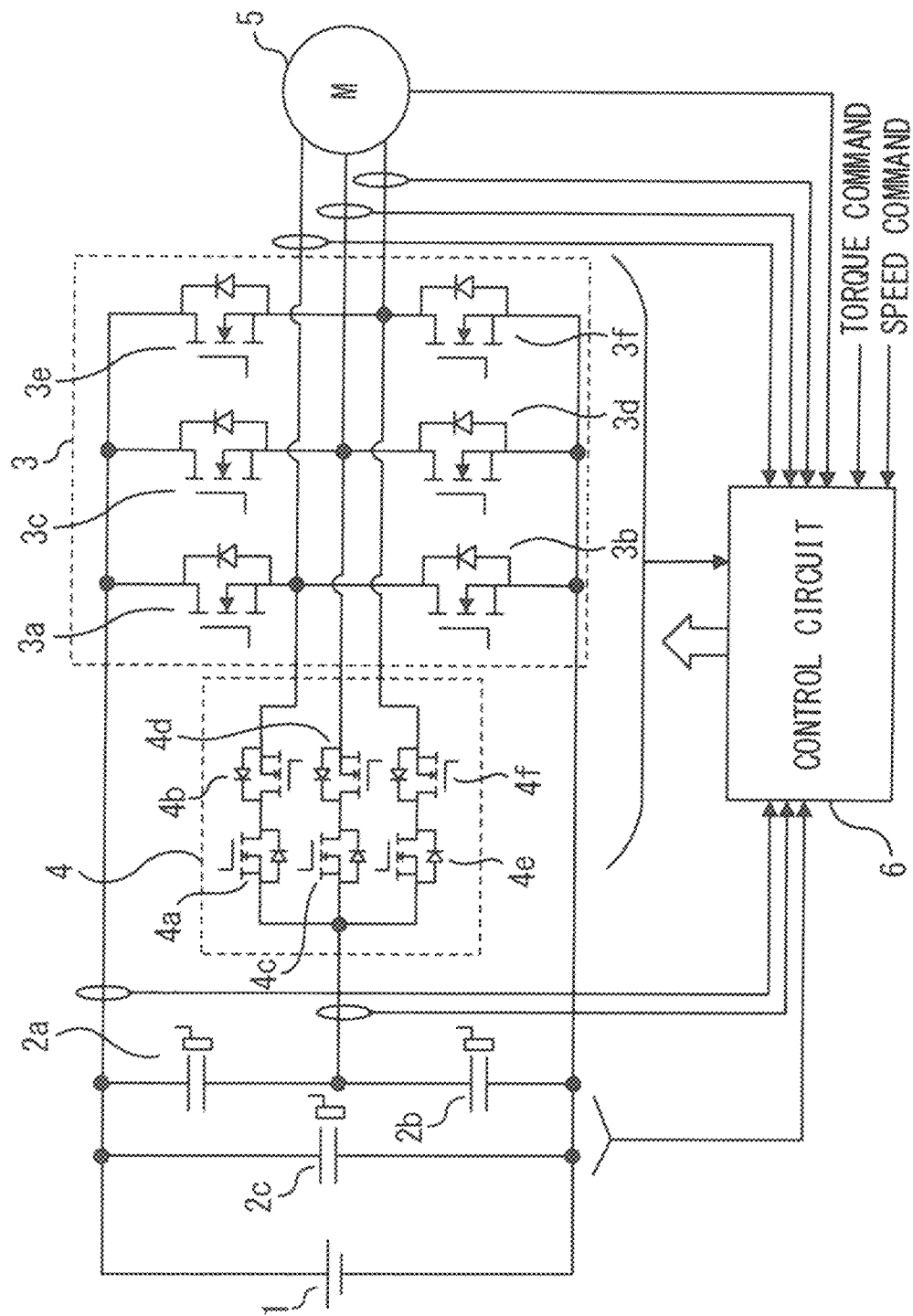
FIG. 16 is a configuration diagram of a power conversion device according to embodiment 2 of the present disclosure.

In contrast, in the present embodiment 2, as shown in FIG. 16, the inverter 3 and the switch circuit 4 are configured using metal-oxide-semiconductors (MOS) for all the elements thereof. Even in the case of using this configuration, the same operations and effects as in embodiment 1 can be provided.

Although the disclosure is described above in terms of various exemplary embodiments and implementations, it should be understood that the various features, aspects, and functionality described in the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS

1 DC power supply
2a, 2b second capacitor
2c first capacitor
3 inverter
3a to 3f switching element
4 switch circuit
4a to 4f switching element
5 motor
6 control circuit

The invention claimed is:

1. A power conversion device comprising:
an inverter for driving a motor;
a first capacitor, and a second capacitor including a plurality of capacitors connected in series to each other, the first capacitor and the second capacitor being connected in parallel to a DC power supply;
a switch circuit having a plurality of switching elements and connected between the inverter and the second capacitor; and
a control circuit for controlling the inverter and the switch circuit, wherein
the control circuit performs control to switch the switch circuit so as to supply current from the second capacitor to the inverter during 3-level operation, and supply current from both of the first capacitor and the second capacitor to the inverter during 2-level operation.

2. The power conversion device according to claim 1, wherein
the control circuit performs control so that an amount of current supplied to the motor is greater during the 2-level operation than during the 3-level operation.

3. The power conversion device according to claim 1, wherein
the control circuit performs control so that the inverter performs 3-level operation if a reduction amount of harmonic iron loss in the motor in a case where the inverter performs 3-level operation is greater than an increase amount of loss in the inverter in a case where the inverter is switched from the 2-level operation to the 3-level operation.

4. The power conversion device according to claim 1, wherein
the control circuit performs control so as to switch to the 2-level operation when high torque is required and to the 3-level operation when low torque is required, in a case where the motor has the same rotational speed.

5. The power conversion device according to claim 1, wherein
the control circuit performs control so as to switch between the 2-level operation and the 3-level operation in accordance with a rotational speed of the motor, in a case where the motor has the same torque.

6. The power conversion device according to claim 1, wherein
the control circuit performs control so that a carrier frequency during the 3-level operation is not greater than a carrier frequency during the 2-level operation, in a case where the motor has the same rotational speed.

7. The power conversion device according to claim 1, wherein
the control circuit performs control to switch the switch circuit on the basis of a torque command and a rotational speed command for the motor.

8. The power conversion device according to claim 7, wherein
the control circuit performs control so that an amount of current supplied to the motor is greater during the 2-level operation than during the 3-level operation.

9. The power conversion device according to claim 7, wherein
the control circuit performs control so that the inverter performs 3-level operation if a reduction amount of harmonic iron loss in the motor in a case where the inverter performs 3-level operation is greater than an increase amount of loss in the inverter in a case where the inverter is switched from the 2-level operation to the 3-level operation.

10. The power conversion device according to claim 2, wherein
the control circuit performs control so that the inverter performs 3-level operation if a reduction amount of harmonic iron loss in the motor in a case where the inverter performs 3-level operation is greater than an increase amount of loss in the inverter in a case where the inverter is switched from the 2-level operation to the 3-level operation.

11. The power conversion device according to claim 7, wherein
the control circuit performs control so as to switch to the 2-level operation when high torque is required and to the 3-level operation when low torque is required, in a case where the motor has the same rotational speed.

12. The power conversion device according to claim 2, wherein
the control circuit performs control so as to switch to the 2-level operation when high torque is required and to the 3-level operation when low torque is required, in a case where the motor has the same rotational speed.

13. The power conversion device according to claim 3, wherein
the control circuit performs control so as to switch to the 2-level operation when high torque is required and to the 3-level operation when low torque is required, in a, case where the motor has the same rotational speed.

14. The power conversion device according to claim 7, wherein
the control circuit performs control so as to switch between the 2-level operation and the 3-level operation in accordance with a rotational speed of the motor, in a case where the motor has the same torque.

15. The power conversion device according to claim 2, wherein
the control circuit performs control so as to switch between the 2-level operation and the 3-level operation in accordance with a rotational speed of the motor, in a case where the motor has the same torque.

16. The power conversion device according to claim 3, wherein
the control circuit performs control so as to switch between the 2-level operation and the 3-level operation in accordance with a rotational speed of the motor, in a case where the motor has the same torque.

17. The power conversion device according to claim 4, wherein
the control circuit performs control so as to switch between the 2-level operation and the 3-level operation in accordance with a rotational speed of the motor, in a case where the motor has the same torque.

18. The power conversion device according to claim 7, wherein
the control circuit performs control so that a carrier frequency during the 3-level operation is not greater than a carrier frequency during the 2-level operation, in a case where the motor has the same rotational speed.

19. The power conversion device according to claim 2, wherein
the control circuit performs control so that a carrier frequency during the 3-level operation is not greater than a carrier frequency during the 2-level operation, in a case where the motor has the same rotational speed.

20. The power conversion device according to claim 3, wherein
the control circuit performs control so that a carrier frequency during the 3-level operation is not greater than a carrier frequency during the 2-level operation, in a case where the motor has the same rotational speed.

* * * * *